United States Patent

Smit

[11] Patent Number: 5,958,657
[45] Date of Patent: Sep. 28, 1999

[54] REGENERATION OF SPENT FIXER SOLUTION

[75] Inventor: Jakob Van Rouendal Smit, Pretoria, South Africa

[73] Assignee: Marcel Sciarone, Johannesburg, South Africa

[21] Appl. No.: 09/117,902
[22] PCT Filed: Feb. 14, 1997
[86] PCT No.: PCT/NL97/00065
    § 371 Date: Feb. 9, 1999
    § 102(e) Date: Feb. 9, 1999
[87] PCT Pub. No.: WO97/30377
    PCT Pub. Date: Aug. 21, 1997

[30] Foreign Application Priority Data

Feb. 15, 1996 [ZA] South Africa .......................... 95/9699

[51] Int. Cl.⁶ .................................................. G03C 5/395
[52] U.S. Cl. .......................................... 430/398; 430/400
[58] Field of Search .................................... 430/398, 400

[56] References Cited

U.S. PATENT DOCUMENTS 3,660,079  5/1972  Govani ....................................... 75/417
4,008,077  2/1977  Wallace ...................................... 75/713
5,244,777  9/1993  Fyson ........................................ 430/398

FOREIGN PATENT DOCUMENTS 1 353 805  5/1974  United Kingdom .

OTHER PUBLICATIONS

Derwent Publications: JP 49 031 153–A (Mar. 20, 1974); Database "Abstract".

Derwent Research Disclosure #209053 (Sep. 10, 1981): White, W.W. Recovering metals from waste solutions . . . .

Publication: Grant, Haist "Modern Photographic Processing" (1979) Wiley & Sons, Inc. (pp. 612–616).

Primary Examiner—Hoa Van Le
Attorney, Agent, or Firm—Burns, Doane, Swecker & Mathis, L.L.P.

[57] ABSTRACT

A process for regenerating spent fixer solution which includes the steps of adding finely particulate zinc, such as zinc dust, to the solution to cause silver dissolved therein to precipitate and removing the precipitate from the solution hereby producing a regenerated fixer solution.

11 Claims, 1 Drawing Sheet

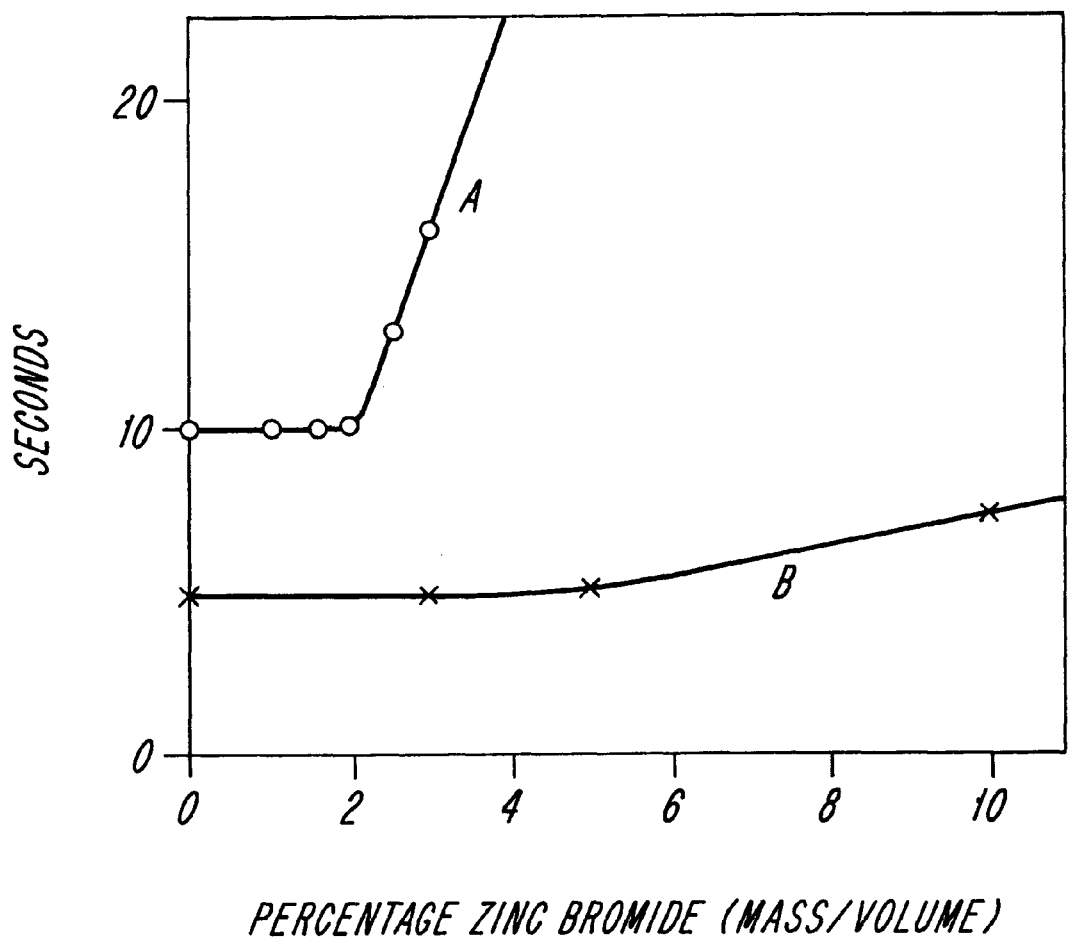

REGENERATION OF SPENT FIXER SOLUTION

BACKGROUND OF THE INVENTION

The present invention relates to the regeneration of spent fixer solution resulting from the processing of black-and-white films.

The photographic processing of various types of films, including lithographic and x-ray films involves the development of an image by reduction of silver halide crystals to metallic silver and the removal of the unused silver halides from the film. Various photographic fixer solutions are used in the industry to dissolve the residual silver halide. The most common form of photographic fixer solution is one which contains a thiosulphate such as sodium thiosulphate or ammonium thiosulphate as active ingredient. A spent fixer solution is one which has been used for fixing film and in this specification and claims this is the meaning which will be given to the term "spent fixer solution".

Silver recovery from spent fixer solution is customarily done by electrolysis. Such processes suffer from a number of disadvantages. Apart from the relatively high capital and maintenance costs, and the relatively low rate of throughput, the process is also relatively inefficient. As full recovery is being approached, side reactions become increasingly important, leading to the precipitation of sulphur. Usually it is possible to recover only of the order of 97 to 99 percent of the silver originally present.

Although it is possible to recover the residual silver, e.g. with steel wool, such silver is considered by many not to be worthwhile. The barren fixer, with or without residual silver (which is highly toxic to lower forms of life), is usually disposed of into the sewer, annually adding tonnage quantities of barren fixer solution, an environmentally unfriendly material, to the elecrolyte load of urban wastewater.

In general, spent fixer solution which has been subjected to electrolysis is unsuitable for re-use. For not only is part of the thiosulphate ion oxidised at the anode while the silver is being deposited at the cathode, but other sulphur species are also formed, and their presence in the electrolysed fixer solution tends to lead to the deposition of harmful deposits in the processing equipment. Electrolysis produces a relatively dark color in the fixer solution (probably by electrolytic oxidation of some of the additives), and both ammonium thiosulphate and some of the additives require replenishment if the use of the fixer is to be extended.

Another small-scale method for silver recovery comprises passing the spent fixer solution through a column packed with a cartridge of an alloy fabricated into a fibrous form resembling steel wool. Recovery is however usually incomplete and the treated fixer solution is unsuitable for re-use. Moreover, the method adds heavy metals to the effluent, which customarily goes straight down the drain.

South African Patent No. 90/7735 teaches precipitation of the silver as silver sulphide with a solution of the sulphide or hydrosulphide of an alkali metal or ammonium. The mother liquor drawn off after the silver sulphide has settled out is claimed to be regenerated and suitable for re-use. But the method suffers from a number of disadvantages. Addition of the sulphide or hydrosulphide has to be carefully controlled, for excess sulphide leads to precipitation of sulphur. The spent fixer solution cannot be regenerated at source (e.g. in large hospitals), in the first instance because there is always the accompanying risk of foul-smelling, highly toxic hydrogen sulphide gas being released during processing, particularly if the pH of the fleer solution is at the lower end of the typical operating range. The reagent itself is characterised by a smell of hydrogen sulphide.

Also, the recovered silver sulphide has to be roasted before the silver may be smelted out, in the process sending the sulphide into the atmosphere as sulphur dioxide (the "acid rain" gas), unless steps are taken to scrub it out from the gases given off.

SUMMARY OF THE INVENTION

According to the present invention, a process for regenerating spent fixer solution includes the steps of adding finely particulate zinc to the solution to cause silver dissolved therein to precipitate and removing the precipitate from the solution thereby producing a regenerated fixer solution.

DESCRIPTION OF THE DRAWING

The drawing illustrates graphically the effect of varying quantities of solid zinc bromide dissolved in fixer solution on the performance thereof.

DESCRIPTION OF EMBODIMENTS

The spent fixer solution will always contain dissolved silver and may be any described above. Generally the spent fixer solution will be a thiosulphate solution, e.g. an ammonium or sodium thiosulphate solution. The invention has particular application to the regeneration of spent fixer solutions resulting from the processing of black-and-white films.

Since the role of fixer solution in the processing of exposed film is to leach out all silver halide particles from the emulsion that had not been reduced to elemental silver by the developer—since they had not been activated by photons during exposure of the film—the spent fixer contains the silver ions usually as a thiosulphate complex, as well as bromide ions. Fixer solution regeneration and silver recovery with particulate zinc therefore effectively comprises replacing the silver halide in the fixer solution with zinc halide:

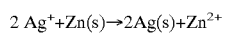

$$2\,Ag^+ + Zn(s) \rightarrow 2Ag(s) + Zn^{2+}$$

The amount of particulate zinc used, particularly if of the fraction known in the industry as ultrafine zinc dust, should not be in too large an excess. For the excess will first reduce any dissolved air derived oxygen and thereafer may slowly react with the water to release bubbles of hydrogen gas, which may adhere to silver particles and give them sufficient buoyancy to prevent their ready settling out.

The stoichiometric amount of zinc metal required to precipitate one gram of silver is just over 0,3 g. In practice, the amount of zinc dust required may be conveniently taken as about 1 g of Zn per every 3 g of Ag present in the fixer solution to be regenerated. At the completion of this heterogeneous reaction, residual zinc metal is not expected to react with any of the ingredients of the fixer solution. Thus, the mass of zinc added will typically be 0.30 to 0.35 the mass of silver present in the spent fixer solution.

The particulate zinc preferably has a particle size less than 10 microns, more preferably a particle size less than about 8 microns, most preferably a particle size less than about 4 microns. A suitable fraction is that known in the art as the fine zinc fraction or zinc mining dust, of particulate size range 4 to 8 microns; but more suitable is that known in the art as ultrafine zinc dust, of particle size range 2 to 4 microns.

An important advantage of the process of the invention is that the finely divided silver displaced by the zinc dust carries down with it the bulk of the gelatin released into the spent fixer solution as the silver halide is dissolved. As a result, there is no appreciable build-up of gelatin in repeatedly regenerated fixer solution and, as consequence, no problems of sludge formation in storage tanks or in the fixer tank of the processing equipment are experienced. Also absent are slimy deposits on film or on the rollers of processors.

Removal of the precipitated silver from the solution may be achieved by methods known in the art. One such method is filtration. Alternatively, and preferably, the precipitated zinc forms a sludge, the sludge is allowed to settle out of the solution forming a supernatant and the supernatant is separated from the sludge.

When a silver sludge is formed and separated, it may be washed with water only before drying. The product is obtained as fairly hard lumps, which require milling down before mixing with a flux and smelting can proceed. However, mixing the sludge with a hot, moderately concentrated sodium hydroxide solution and setting the mixture aside for a few minutes, dissolves and/or destroys the gelatin. Residual zinc and zinc oxide are also dissolved. Subsequent washing with water and drying produces a powder consisting of essentially pure silver.

Treatment of the recovered solids substantially to eliminate co-separated gelatin may be done by suspending the solids in a solution, preferably a hot solution, of caustic soda, for example, a 10 percent (m/v) caustic soda solution at a temperature of about 60° C., decanting the liquid after the solids have settled out, washing the solids two or three times by decantation with water, and drying.

The regenerated fixer solution may be used as such. If pH adjustment is desired or necessary, then this may be achieved by addition of a suitable acid such as acetic acid. An example of a suitable acid is glacial acetic acid. Antioxidant additives such as sodium sulphite may also have to be replenished.

Advantages of the process of the invention include the following:

(a) No bad or noxious odors are generated by the process.

(b) Because of the above, and the fact that the reaction is completed in such a relatively short interval, regeneration of the spent fixer solution may be conveniently done at source, such as at hospitals, e.g. by carrying out the processing in, for example, 210 liter plastic drums or larger plastic tanks each mounted on a stand to facilitate drawing off of the regenerated fixer solution. Expensive transportation between source and a central processing facility may therefore be avoided.

(c) Throughput of the process of the invention is determined by the size of the containers used. With plastic drums and relatively small processing tanks, handstirring is adequate. Capital investment in equipment is therefore modest.

(d) The fixer solution may be safely regenerated and re-used over at least 5 to 10 cycles or more, depending on the degree of developer carryover.

(e) The shelf-life of film (e.g. x-ray film) processed using inter alia the regenerated fixer of the invention is comparable with that of film processed with the use of virgin fixer, as is shown in the Examples.

After the last cycle of use, and silver recovery, the "exhausted" fixer solution may be passed on to a producer of liquid fertiliser to utilise the fertiliser values of the ammonium thiosulphate and zinc. Use of The process of the invention will, of course, lead to a large reduction in the volume for disposal of this environmentally unfriendly material, and its use in fertiliser mixtures will eliminate spent fixer solution as a source of pollution.

The invention will now be illustrated by the following examples.

EXAMPLE 1

In 50 ml aliquots of ready-to-use virgin fixer solution were dissolved varying quantities of solid zinc bromide, and the solutions each diluted to 100 ml. A strip of green x-ray film was immersed in each of these zinc bromide containing fixer solutions, one at a time. While the strip of green film was gently agitated, the time was observed for the silver bromide to be cleared away from the film. Curve A of FIG. 1 shows that, provided the zinc bromide in the fixer solution did not exceed about 2 percent, there was no significant increase in the time taken for the solution to dissolve away completely the silver bromide over that where no zinc bromide was dissolved into the fixer solution before the two-fold dilution.

EXAMPLE 2

The set of experiments in Example 1 was repeated, this time using aliquots of fixer concentrate (from the same supplier), and diluting to the concentration of ready-to-use fixer solution after the varying quantities of solid zinc bromide had been dissolved in the various aliquots. Curve B of FIG. 1 shows that the time taken to clear strips of green x-ray film was (a) about 5 seconds with no dissolved zinc bromide, (b) still about 5 seconds with 5 percent zinc bromide, and (c) about 7 to 8 seconds with 10 percent dissolved zinc bromide.

Calculations show that 2, 5 and 10 percent of dissolved zinc bromide would translate into respectively about 4, 10 and 20 cycles of regeneration /re-use if the mean silver content of the fixer is taken as 4,5 g/l at the end of a cycle.

EXAMPLE 3

A field trial was conducted in the radiology department of the Clinic of the Columbus Stainless Steel Joint Venture in Middelburg, Mpumalanga Province. Seventy-five liters of spent fixer solution were treated in a 100 liter plastic tank by addition of portions of zinc dust (of the ultra-fine dust fraction, supplied by Zinchem (Pty) Limited, of Benoni) and hand-stirring for 15 minutes at a time until a small amount of filtrate of the mixture gave a white (as opposed to a brown to black) precipitate when treated with a few drops of a 10 percent sodium sulphide solution. This showed that silver precipitation was complete.

The clear mother liquid was siphoned off after allowing the mixture to stand overnight Thus producing a regenerated fixer solution. The regenerated fixer solution was thereafter separately re-used four times, with regeneration after each cycle, but with no attempt being made to adjust the pH or replenish any of the additives. The silver content of the spent fixer during the trial varied between about 4 and 5 g/l. No change in the action of the repeatedly re-cycled fixer solution or the quality of the x-ray film images over the entire course of the 7 month trial was reported.

EXAMPLE 4

A similar field trial to that described in Example 3 was conducted over a three month period at Rand Mutual Hospital, the principal Johannesburg hospital serving the South African mining industry. A quantity of 125 liters of fixer solution was used in isolation with one of its x-ray film processors and repeatedly regenerated, about 60 liters at a time, until the mean number of cycles of regeneration and re-use amounted to between 4 and 5. The silver sludge was left at the bottom of the processing tank throughout the trials. The silver content of the spent fixer solution processed varied between about 4 and 7 g/l. The fixer solution in the circuit gradually picked up a light yellow-brown color.

No attempt was made throughout these trials to replenish any of the fixer additives. The pH required adjustment with glacial acetic acid on one occasion Again, during the entire course of the trials no difference between the performance of the regenerated fixer solution or the quality of the x-ray film images and those of the adjacent line using only virgin fixer solution could be detected.

EXAMPLE 5

To test the shelf-life of the film treated inter alia with repeatedly regenerated fixer solution, an x-ray film processed with regenerated fixer solution at the end of the trials described in Example 4 was subjected to the standard "Light Fastness Test", STM 405, by the South African Bureau of Standards, using film processed with virgin fixer solution as the control. The test comprises irradiating portions of film with the UV light from a Xenon lamp in a chamber at 63° C. and a relative humidity of 30 percent.

After about 200 hours' irradiation both samples started to show a very slight yellow coloration. At the end of the test, i.e. after 300 hours' irradiation, the yellow coloring had not noticeably intensified and was similar for test sample and control. The coloring was adjudged as "not significant". The SABS report described the accelerated ageing test as equivalent to at least 5 years of natural ageing.

EXAMPLE 6

A similar field trial to that described in Example 4 was conducted at the H.F. Verwoerd Hospital in Pretoria. The fixer from three processing units was combined as an isolated unit and repeatedly regenerated in accordance with the process of the invention, using a 210 liter plastic drum with an open top. The volume of fixer in the system was about 275 liters. Over the 14 week trial about 2 525 liters of regenerated fixer were produced, representing about 9 cycles of regeneration and re-use.

Again, no additives other than anti-oxidant sodium sulphite were replenished, and the pH was adjusted with acetic acid on only two occasions in the course of the trials. No deterioration in fixer solution performance or quality of film images was observed with ordinary double-coated medical x-ray film. The silver sludge was again left in the processing tank throughout the trials. The silver content of the fixer solution varied between about 3 and 6 g/l and, after the equipment was serviced, between about 4 and 6 g/l.

I claim:

1. A process for regenerating spent fixer solution includes the steps of adding finely particulate zinc to the solution to cause silver dissolved therein to precipitate and removing the precipitate from the solution thereby producing a regenerated fixer solution and using the regenerated fixer solution without replenishing active fixer ingredient, optionally with adjustment of pH and replenishment of antioxidant.

2. A process according to claim 1 wherein the finely particulate zinc forms a mixture with the solution and the mixture is agitated.

3. A process according to claim 1 or claim 2 wherein the zinc precipitate is separated from the solution by filtration.

4. A process according to claim 1 or claim 2 wherein the precipitated zinc forms a sludge, the sludge is allowed to settle out of the solution forming a supernatant and the supernatant is separated from the sludge.

5. A process according to claim 1 wherein the particular zinc has a particle size less than 10 microns.

6. A process according to claim 1 wherein the particular zinc has a particle size less than 8 microns.

7. A process according to claim 1 wherein the zinc dust has a size in the range 4 to 8 microns.

8. A process according to claim 1 wherein the particular zinc has a size in the range 2 to 4 microns.

9. A process according to claim 1 wherein the mass of zinc added is 0.3 to 0.35 the mass of silver present in the spent fixer solution.

10. A process according to claim 1 wherein the spent fixer solution is a thiosulphate solution.

11. A process according to claim 1, wherein the silver content of the spent fixer solution amounts to 3–7 g/l.

* * * * *